United States Patent [19]
Soltis

[11] Patent Number: 4,621,833
[45] Date of Patent: Nov. 11, 1986

[54] CONTROL SYSTEM FOR MULTISTABLE SUSPENSION UNIT

[75] Inventor: Michael W. Soltis, Dearborn, Mich.

[73] Assignee: Ford Motor Company, Dearborn, Mich.

[21] Appl. No.: 809,672

[22] Filed: Dec. 16, 1985

[51] Int. Cl.[4] .......................................... B60G 11/26
[52] U.S. Cl. .................................. 280/707; 100/141; 280/771; 280/6 R; 280/DIG. 1
[58] Field of Search ............ 280/771, 707, 6 R, 6 H, 280/DIG. 1; 100/141, 142, 143

[56] References Cited

U.S. PATENT DOCUMENTS

| | | | |
|---|---|---|---|
| 1,930,317 | 10/1933 | Mathews | 188/299 |
| 2,140,767 | 12/1938 | Sanford | 188/299 |
| 2,698,068 | 12/1954 | Hein | 188/299 |
| 3,146,862 | 9/1964 | Van Winsen | 188/279 |
| 3,537,715 | 11/1970 | Gualdoni | 280/6 R |
| 3,548,977 | 12/1970 | Morgan | 188/279 |
| 3,608,925 | 9/1971 | Murphy | 280/112 A |
| 3,861,696 | 1/1975 | Gustafsson | 280/6 H |
| 3,895,816 | 7/1975 | Takahashi et al. | 280/6 H |
| 3,913,938 | 10/1975 | Aikawa et al. | 280/112 A |
| 4,313,529 | 2/1982 | Kato et al. | 188/299 |
| 4,333,668 | 6/1982 | Hendrickson et al. | 280/703 |
| 4,345,661 | 8/1982 | Nishikawa | 180/141 |
| 4,361,346 | 11/1982 | Harris | 280/707 |
| 4,371,191 | 2/1983 | Goldberg et al. | 280/707 |
| 4,468,050 | 8/1984 | Woods et al. | 280/707 |
| 4,519,627 | 5/1985 | Shibahata et al. | 280/701 |
| 4,526,401 | 7/1985 | Kakizaki et al. | 280/707 |
| 4,575,116 | 3/1986 | Miyata | 280/707 |
| 4,586,728 | 5/1986 | Tokunaga et al. | 280/707 |

Primary Examiner—John J. Love
Assistant Examiner—Kenneth R. Rice
Attorney, Agent, or Firm—Jerome R. Drouillard; Roger L. May

[57] ABSTRACT

An operating system for a multistable suspension unit having a plurality of predetermined operating states includes a suspension control unit which selects a preferred suspension unit operating state based upon input parameters including vehicle speed and linear acceleration and predicted lateral acceleration. The system includes a sensor for determining steering center position and steering system excursion angle and angular velocity.

19 Claims, 14 Drawing Figures

| | DETECTOR A | DETECTOR B | |
|---|---|---|---|
| COUNTER-CLOCKWISE ROTATION ↑ | 0<br>1<br>1<br>0<br>0<br>1 | 0<br>0<br>1<br>1<br>0<br>0 | CLOCKWISE ROTATION ↓ |

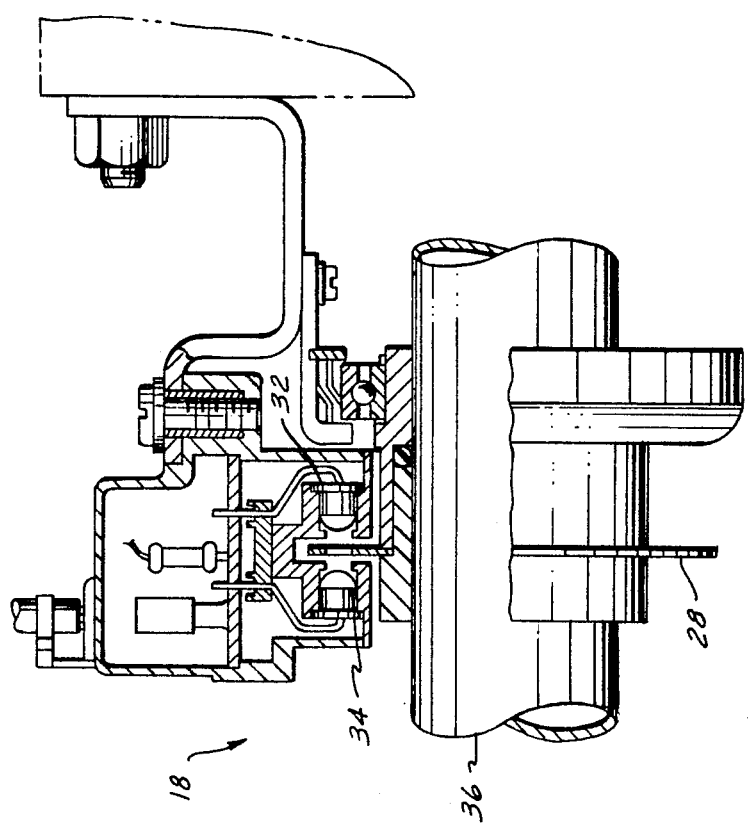
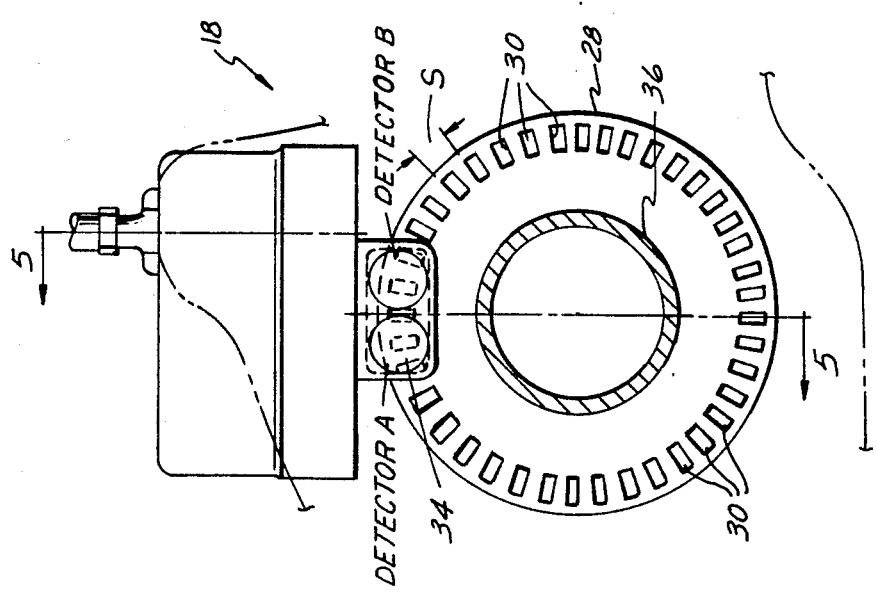

CONTROL SYSTEM FOR MULTISTABLE SUSPENSION UNIT

BACKGROUND OF THE INVENTION

1. Field of the Invention

This invention relates to a control system for use with a multistable suspension unit.

2. Disclosure Information

Multistable automotive suspension units have been known for some time. The present control system is suitable for use with a multistable unit of the type disclosed in U.S. Pat. No. 4,313,529 in which a hydraulic mechanism. The damping force is rendered adjustable by a damper is provided with a damping force adjusting rotary valve positioned within a passageway extending through the damper's piston. The rotary valve is connected to a potentiometer which is arranged such that its output matches that of a reference signal when the desired position of the shock absorber has been reached. This damper is defined as "multistable" for the purposes of this application because it has a plurality of predetermined states in which it may be selectively operated.

Multistable suspension units are intended to provide adaptive control of vehicle ride and hangling. In typical fashion, the particular state chosen for the multistable unit is determined by a control algorithm with inputs from a variety of vehicle parameters. For example, it is known to control a multistable suspension unit by utilizing vehicle linear acceleration, braking, steering activity, and vehicle speed, as well as through a manually operable mode switch. Known systems trigger a "firm" setting for a multistable suspension unit when the vehicle's speed exceeds a given value, or when the brakes are applied, or when lateral acceleration (turning) is sensed.

U.S. Pat. No. 2,140,767 discloses means for controlling shock absorber firmness as a function of intake manifold vacuum. Intake manifold vacuum is correllatable under certain conditions with vehicle acceleration, but is not reliable indication of acceleration for vehicles equipped with diesel engines or certain other engines equipped with turbocharger or fuel injection equipment which may limit or even totally eliminate intake manifold vacuum.

U.S. Pat. No. 3,861,696 discloses an amplitude responsive active damper system in which damping is increased as the magnitude of the vehicle's angular velocity increases. This system is intended to prevent rocking of the vehicle.

Examples of systems in which shock absorber rates are controlled solely by brake operation are disclosed in U.S. Pat. Nos. 3,537,715 and 3,548,977. U.S. Pat. Nos. 2,698,068 and 3,146,862 disclose systems in which brake line pressure operates upon piston and sliding valve arrangements designed to vary the flow area of fluid through modified shock absorbers so as to reduce brake dive. None of these systems is adaptive because none may be preferentially employed. More specifically, each is responsive to brake pressure and therefore actuates whenever brake pressure is present, regardless of any other operating conditions.

U.S. Pat. Nos. 3,608,925 and 4,345,661 illustrate use of steering input and control of suspension units. A related type of control is disclosed in U.S. Pat. No. 3,895,816 in which a centrifugal force sensor is operatively associated with valving to bias the vehicle so as to prevent excessive body roll during cornering. Systems employing fixed steering angle sensors are prone to failure due to misadjustment of the sensor inasmuch as precise angular measurements must be obtainable from such sensors if they are to be employed in systems capable of correcting or anticipating and preventing excessive roll of an automobile body during a cornering maneuver. A related problem affects systems employing centrifugal force sensors inasmuch as such forces cannot be sensed until they exist and once such force has come into existence the vehicle's body will typically have assumed an attitude which can be corrected only by an active suspension device capable of exerting force independent of its velocity of operation. Thus, to be effective, a device for providing input to a control system for operating a suspension unit should anticipate lateral acceleration rather than merely sense acceleration.

U.S. Pat. Nos. 3,146,862 and 3,548,977 illustrate the use of vehicle speed as an input to a system for modulating vehicle shock absorber performance.

U.S. Pat. Nos. 1,930,317 and 3,548,977 disclose the use of manually operable means for varying shock absorber settings.

U.S. Pat. No. 4,468,050 discloses a variable rate automotive suspension system that is controlled in accordance with a software routine stored in a computer to compensate for changes in road conditions and to reduce roll and pitch during cornering. This system uses a sensor associated with each of the controllable shock absorbers to determine the position of the axle with respect to the chassis; it does not use a sterring wheel sensor.

U.S. Pat. Nos. 3,913,938; 4,333,668; and 4,345,661 disclose vehicle suspension systems having shock absorbers which are controlled in response to the roll and pitch of the vehicle. These systems do not utilize the control parameter of vehicle steering input.

U.S. Pat. Nos. 4,371,191 and 4,519,627 disclose control systems for adjusting various vehicle suspension parameters wherein the control systems utilize several inputs, including steering direction. In each case, there is no calculation of a steering straight-ahead reference position in the control system. Certain prior art steering systems are believed to suffer from yet another deficiency inasmuch as steering excursions grewater than 180 degrees of steering wheel travel may confuse the system by creating a false indication that the steering system is returning to the center position.

U.S. Pat. No. 4,526,401 discloses an electronic control system for a shock absorber in which a detector and comparator combination is employed for the purpose of establishing that a motor drive unit has properly positioned the shock absorber at the desired degree of firmness.

It is an object of the present invention to provide a control system for a multistable suspension unit which control system utilizes the parametric inputs of vehicle speed, linear acceleration, (including braking), and calculated lateral acceleration.

It is another object of the present invention to provide a control system for a multistable suspension unit including a steering sensor which dynamically determines a center position.

It is yet another object of the present invention to provide a control system for a multistable syspension unit including a steering sensor which requires no recalibration to permit precise operation throughout its useful life.

It is a further object of the present invention to provide a control system for a multistable suspension unit including feedback sensing of the position state of the multistable suspension unit.

SUMMARY OF THE DISCLOSURE

In accordance with an embodiment of this invention, an operating system for a multistable suspension unit having a plurality of predetermined operating states and being adapted for use with a motor vehicle with a steering system comprises first means for measuring the speed of the motor vehicle and second means for predicting the lateral acceleration of the motor vehicle. The second means preferably comprises centering means for dynamically determining the center position for the steering system of the motor vehicle, angle measuring means operatively associated with the centering means for measuring the excursion angle of the steering system from the predetermined center position and processing means coupled to the speed measuring means and angle measuring means for combining measured values of vehicle speed and steering system excursion angle according to a predetermined formula so as to yield, as a function of vehicle speed and steering system excursion angle, a calculated value for predicting lateral acceleration. The steering system's angular velocity may also be utilized in the calculation of predicted lateral acceleration.

The centering means for dynamically determining the center position for the steering system of the motor vehicle preferably comprises a system operated according to a method comprising the steps of assuming an initial center position, defining two circumferential zones of equal magnitude defined by a first threshold extending clockwise and a circumferentially displaced second threshold extending counterclockwise from the initial center position, recording the amount of time the steering system is operated outside of the circumferential zones defined by the first and second thresholds during a predetermined time period, and determining an updated initial center position based upon the amount of time the steering system was operated outside of the circumferential zones defined by the thresholds during the predetermined time period.

The operating system of the present invention preferably includes means for measuring linear acceleration of the motor vehicle and control means for a multistable motor vehicle suspension unit which utilizes as input parameters measured vehicle speed and linear acceleration and predicted lateral acceleration. The system further preferably includes actuator means for placing a suspension unit into a selected predetermined state.

The system of the present invention preferably includes a feedback circuit which senses the position of the actuator means and reports that position to the system control module.

BRIEF DESCRIPTION OF THE DRAWINGS

FIG. 4 is a plan view, partially cut away, of the steering sensor embodying a component of the present invention.

FIG. 5 is a cross sectional view of the steering sensor of the present invention taken along the line 5—5 of FIG. 4.

DESCRIPTION OF THE PREFERRED EMBODIMENTS

Figure 1:
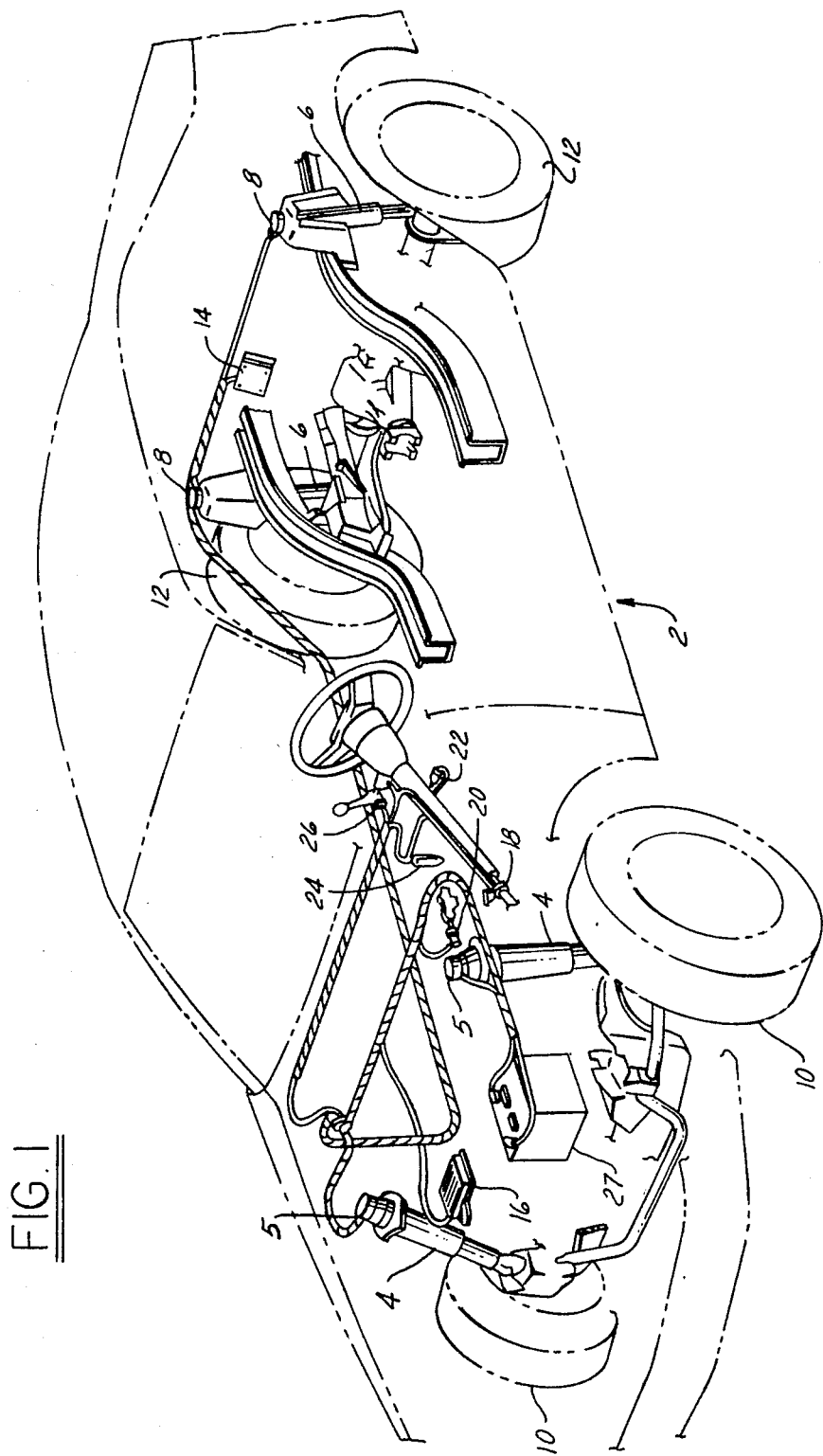
FIG. 1 is a perspective drawing of a motor vehicle incorporating the present invention. This figure shows the various components of a system embodying the present invention.

As shown in FIG. 1, the control system of the present invention is intended for use with adjustable suspension units typically found in automotive vehicles. Motor vehicle 2 is equipped in conventional fashion with adjustable front struts 4, and rear shock absorbers 6. In conventional fashion, the front struts help to control the attitude of the front of the vehicle while rear shock absorbers 6 help to control the attitude of the rear of the vehicle. The adjustable structs 4 and shock absorbers 6 are preferably constructed in a known manner such as disclosed in U.S. Pat. No. 4,313,529 which discloses a means for constructing a strut or shock which is adjustable by a rotary valve positioned within one of the passageways running through the piston. The rotary valve functions to vary the effective cross sectional area of the passageway thus providing an adjustable damping force.

Figure 8:
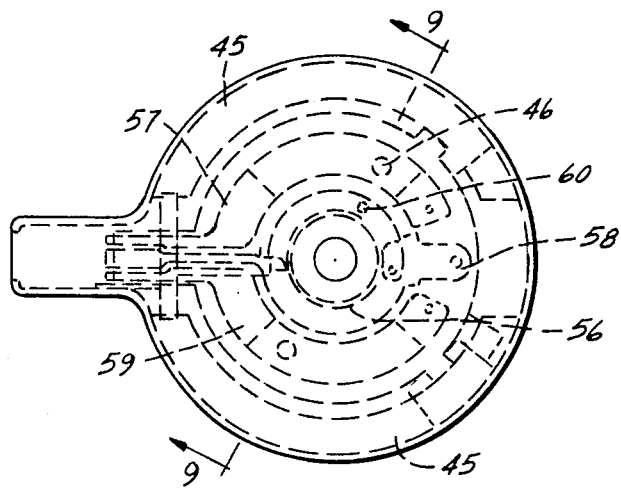
FIG. 8 is a plan view of a portion of the electromagnetic actuator of this invention.
Figure 9:
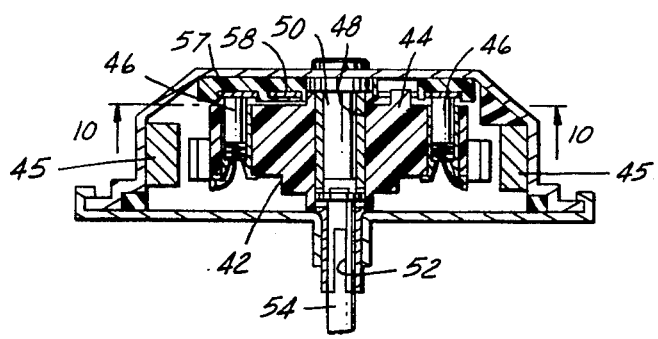
FIG. 9 is a cross sectional view of the actuator of the present invention taken along the line 9—9 of FIG. 8.
Figures 10, 11:
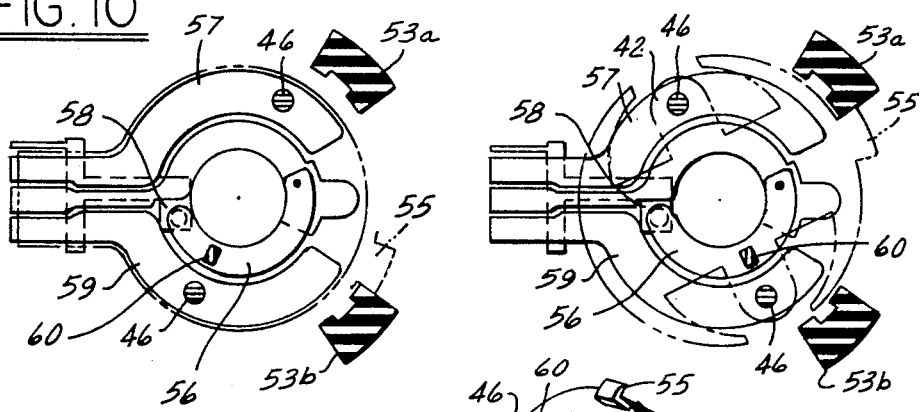
FIG. 10 is a partial diagrammatic plan view of the actuator of the present invention, taken along the line 10—10 of FIG. 9, showing the feedback switch with particularity.
FIG. 11 is similar to FIG. 10 but shows additional details of the armature and feedback switch.
Figure 12:
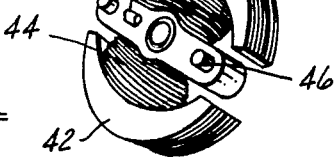
FIG. 12 is a perspective view of the armature used in the actuator of the present invention.

In the system of the present invention the adjustment of damping force is made by a rotary actuator. Such actuators 5 and 8 are shown as being attached to the uppermost portion of front struts 4 and rear shock absorbers 6. The construction of front actuators 5 and rear actuators 8 is shown in detail in FIGS. 8 and 9 and will be discussed at length in this specification.

The system shown in FIG. 1 represents merely one preferred embodiment of the present invention, it being understood that this invention is suitable for use with other suspension units such as air or air/hydraulic or hydraulic load-bearing units or combination load bearing and damping units such as those known in the art. This system could be employed in conjunction with known variable stabilizer bar units as well. In view of this disclosure those skilled in the art will further appreciate that the present invention could be applied preferentially to the suspension units located at only one end of the vehicle such as the front or rear.

The system of the present invention is operated by suspension control module 14 which receives inputs from each of the actuators mounted upon the suspension units as well as inputs from engine control module 16, steering sensor 18, brake sensor 20, speed sensor 22, and mode selector switch 24. The power to operate the system is supplied by the vehicle's main battery 27.

Engine control module 16 provides an acceleration signal to the suspension control module 14. The purpose of this signal is to notify the suspension control module that the vehicle is in an accleration mode of operation. The acceleration signal from engine control module 16 may be triggered by wide open throttle operation, as measured by a throttle position sensor, or by measurement of intake manifold absolute pressure, or by some other type of engine sensor. Alternatively, in view of this disclosure, those skilled in the art will recognize that an acceleration signal could be obtained by use of an accelerometer. Usage of a conventional accelerometer would not be entirely satisfactory, however, inasmuch as such devices merely respond to the presence of acceleration and, unlike an engine parameter device, cannot anticipate accleration. Those skilled in the art will appreciate in view of this disclosure that a vehicle accleration signal could be supplied by a throttle position sensor not operatively associated with an electronic engine control.

Information regarding deceleration of the vehicle is provided by brake sensor 20 which preferably comprises wither a pressure activated switch capable of sensing pressure within the brake lines leading from the brake system's master cylinder (not shown) to each wheel cylinder (not shown). Alternatively, brake sensor 20 could comprise a switch operatively associated with the brake pedal mechanism or any other suitable system for sensing brake operation suggested by this disclosure. Taken together, the engine control module and brake sensor thus comprise means for measuring linear acceleration of the motor vehicle.

Steering sensor 18 provides the suspension control module with a portion of the information necessary for predicting the lateral acceleration of the vehicle. More specifically, steering sensor 18 includes means for measuring the excursion angle of the steering system from a predetermined center position and means for measuring the angular velocity at which the steering system (e.g., the steering shaft) is being operated. As shown in FIGS. 4 and 5, the steering sensor 18 comprises shutter wheel 28 attached to steering shaft 36 which shaft rotates in unison with the steering wheel as the wheel is turned by the driver of the vehicle. Shutter wheel 28 has a plurality of apertures 30, in this case 40 in number, which apertures serve to trigger the activity of detectors A and B as the shutter wheel is rotated with the steering system of vehicle 2. Because there are 40 apertures contained within shutter wheel 28, the steering sensor provides a signal 80 times during one revolution of the steering wheel and as a result each of the 80 signals or steps indicate 4.5° rotation of the steering system.

Figure 6A:
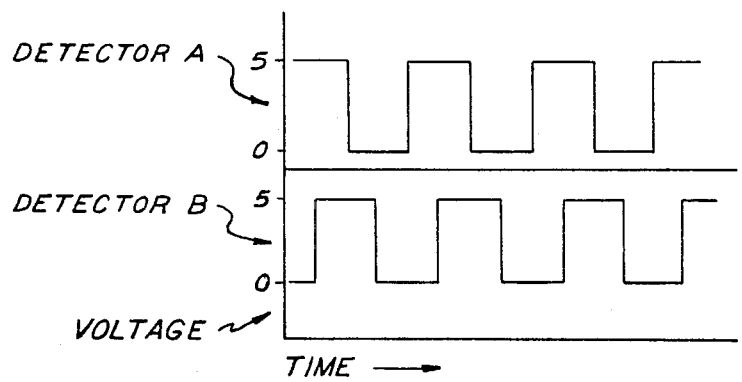
FIG. 6 A illustrates the output wave forms of the detectors employed in the steering sensor illustrated in FIGS. 4 and 5 for clockwise rotation.
FIG. 6B illustrates the output wave forms of the detectors employed in the steering sensor illustrated in FIGS. 4 and 5 for counterclockwise rotation.
Figure 6B:
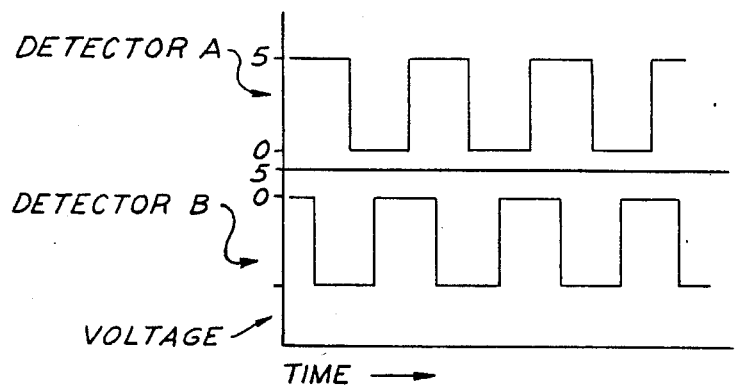

As shown in FIG. 5, each of detectors A and B includes a light emitting diode (LED) 32 and a paired photo diode 34. The combination of the LED and photo diode is used to detect movement of the shutter wheel and hence, the steering system. This is possible because the photo diodes have two states—i.e., they are bistable. A conducting state occurs whenever light from the paired LED passes through an aperture in the shutter wheel and impinges upon the photo diode. The output of the detector circuit then rises to approximately 5 volts. A non-conducting state exists whenever the shutter wheel blocks the transmission of light between the LED and the photo diode. As shown in FIG. 6A, clockwise rotation of shutter wheel 28 produces a waveform pattern for the detectors in which detector A undergoes its transition prior to detector B. In other words, detector A leads detector B. On the other hand, as shown in FIGS. 6B, counterclockwise rotation of the steering sensor produces a waveform pattern for the detectors in which detector A undergoes its transition after detector B and detector A thus lags detector B. Photodiodes A and B are spaced such that their optical centerlines are separated by a distance equivalent to 1.75 times the distance between the corresponding edges of two adjacent apertures. The dimension "S" in FIG. 4. The outputs of detectors A and B are fed to the suspension control module and in this manner the suspension control module is allowed to track the direction of steering system rotation.

Figures 2, 7:
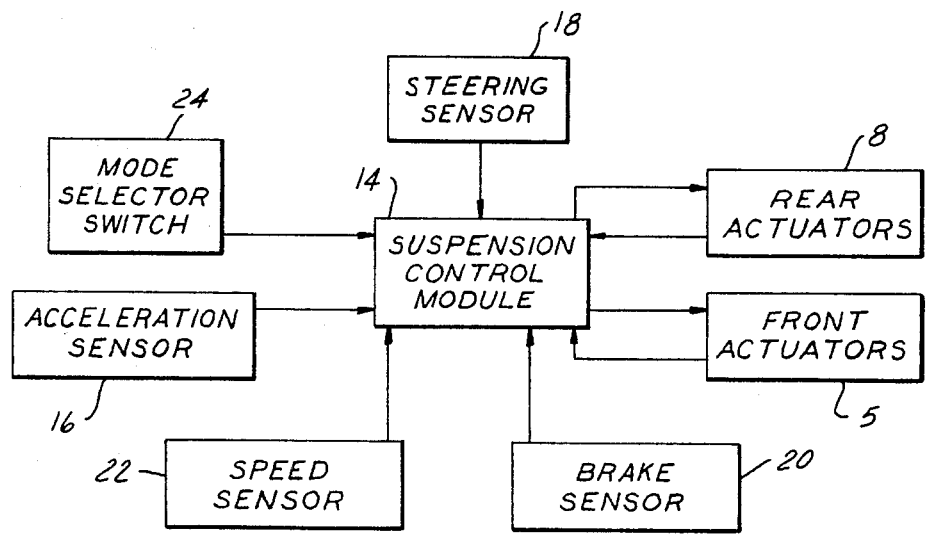
FIG. 2 is an overall system block diagram in accordance with an embodiment of this invention.
FIG. 7 is a truth table illustrating the outputs of detectors A and B illustrated in FIGS. 4—6 as the steering sensor of the present invention is rotated counterclockwise and clockwise.

FIG. 7 is a tabulation of the waveforms shown in FIGS. 6A and 6B in a digital format. In conventional fashion, the appoximately 5 volt maximum output of the detectors is treated as a logical "1", while the zero output state is treated as a logical "0". FIG. 7 shows each of the possible logic pair states which could be output by detectors A and B. The pairs are arranged in the order in which they will be received by the suspension control module for both counterclockwise and clockwise rotation. As seen in FIG. 7, clockwise rotation is read from the bottom of the figure to the upper part of the figure with counterclockwise rotation being read from the top of the tabulation to the lower part of the tabulation.

The output of the detectors is further processed by the suspension control module to yield a signal indicative of the steering system's speed or angular velocity. This operation is performed quite simply by merely tracking the number of transitions of one or both detectors during a given unit of time. The number of such transitions during the sampling period will be directly proportional to the angular speed of the steering system.

The steering sensor and suspension control moduel function in combination as a centering means for dynamically determining a center position of the steering system of the motor vehicle by operating according to a method generally comprising the steps of:

a. assuming an initial center position;
b. defining a first circumferential zone from the initial center position to a first threshold position, and a second circumferential zone extending an equal distance from the initial center position to a second threshold position;
c. recording the amount of time the steering system is operated outside of the circumferential zones defined by the first and second thresholds during a predetermined time period; and
d. determining an updated initial center position based upon the amount of time the steering system is operated outside the circumferential zones defined by the first and second thresholds during a predetermined time period.

Each of steps b, c and d recited above is repeated until the determined initial center position does not change. The repetitions are conducted with threholds defining successively smaller magnitudes of circumferential displacement from the initial center position. It has been determined that initial thresholds having a magnitude of 16 steps of 4.5° clockwise and 16 steps of 4.5° counterclockwise from the initial center provide satisfactory results. These thresholds are modified and utilized as follows to dynamically determine a center position according to the following specific steps:
1. Record the time that the steering system is operated outside the 16-step clockwise threshold and outside the 16-step counterclockwise threshold during a 20 second sampling period.
2. If the steering system was operated outside of either of the thresholds for 11 seconds or more during the 20 second sampling, move the assumed center position to the position of that threshold and record the move.
3. Repeat instructions 1 and 2 using the new assumed center position, but with two thresholds of 8 steps instead of 16 steps. Continue this process with thresholds of 4 steps and 2 steps.
4. If the assumed center position was moved after the 2 step and 4 step sampling periods and both moves were in the same direction, then conduct additional iterations to find the center position as follows:
   a. Additional two step and four step sampling periods are required.
   b. If the center was mooved after the 8 step sampling period in the same direction as the 2 and 4 step moves, then another 8 step sampling period is required.
   c. If an additional 8 step sampling period is required and if the center was moved after the 16 step sampling period in the same direction as the 2, 4 and 8 step moves, then another 16 step sampling period is required.
   d. Repeat instructions 1 through 3, beginning with the largest threshold previously required and proceeding in descending order to the 2 step threshold sampling period.
   e. Repeat instruction 4 with the revised requirement that additional sampling is required only if the latest 2 and 4 step moves were in the same direction as they had previously been moved.
5. After instruction 4 has been completed (during the last opportunity, either the 2 step or 4 step moves were not taken in the established direction) center position has been found. The algorithm may then continue, indefinitely, repeating instructions 1 and 2 using the currently assumed center position and 1 step thresholds to obtain 1 step resolution.

Once the steering center position has been determined to 1 step resolution, the excursion angle of the steering system from the predetermined center position may readily be measured by merely performing an algebraic substraction of the current position from the calculated center position at any particular point in time. This measured excursion angle may then be used in the calculation of predicted lateral acceleration of the motor vehicle. Most, if not all, prior art steering center position sensors require precise positioning of the sensor's componentry in order to permit satisfactory operation of the sensor. This requirement could be expected to lead to inaccurate sensing if the sensor were assembled improperly during the production process or in the event that the sensor's position changed for any reason following installation. The steering sensor of the present invention stands in marked contrast because it requires no prepositioning of any sort upon installation and subsequent changes in its position will have absolutely no effect on the sensor's function.

Speed sensor 22 (FIGS. 1 and 2) provides yet another input to suspension control module 14. The speed sensor preferably comprises a magnetic pickup operatively associated with the transmission, or some other portion of the drive train such as a drive shaft or axle shaft. In view of this disclosure those skilled in the art will recognize that speed of the vehicle could be sensed by any of a variety of means including not only those means which rely upon measurement of rotational speed of a drive train component, but also ground speed measuring means relying upon such methods as radar, sonar, etc.

Still referring to FIG. 1, mode selector switch 24 allows the driver of the motor vehicle to select "automatic" or "hard" settings for the adjustable suspension units. Such selection by the driver comprises yet another input to the suspension control module. Mode indicator light 26 advises the driver of the motor vehicle as to which of the predetermined operating states the suspension units of the vehicle are resting in.

FIG. 2 shows each of the input devices associated with the suspension control module as well as the actuators operatively associated with the control module. As shown in FIG. 2, actuators 5 and 8 send information to the control module and receive commands from the control module. Information sent to the control module is provided by the feedback circuitry contained within the actuators.

FIGS. 8-12 illustrate the construction of the actuator assemblies. Although an electromechanical actuator is disclosed, it will be appreciated by those skilled in the art in view of this disclosure that the actuators could comprise pneumatic, vacuum, hydraulic or, gear motor driven units. It will be further appreciated by those skilled in the art that although the actuators disclosed herein are bistable, the present invention is suitable for use with suspension units having a plurality of predetermined stable operating states.

As shown in FIGS. 8-12, an actuator suitable for use with the present invention comprises armature 42 having winding 44 which is connected to brushes 46. The brushes allow current to pass through the armature in desired fashion so as to select the armature's rotational position within the actuator. Permanent magnets 45 are located about the periphery of the armature. The armature has two stable states it may occupy. These states are rotationally limited by stops 53a and 53b which are engaged by stop striker 55 mounted to the armature. When the armature is energized, it will rotate until striker 55 contacts either of the two stops. The particular direction of rotation is determined by the direction of current flow through the armature which is in turn determined by the suspension control module. Current is passed through armature 42 by means of brushes 46, first conductor 57 and second conductor 59. Both conductors are connectede with the suspension control module. Reversing the current flow within the armature's winding will bias the armature in opposite directions, thereby moving the armature from one of its stable states to the other of said states. Those skilled in the art will recognize in view of this disclosure that the actuators could be driven directly by the suspension control module or by power relays interposed between the control module and the actuators.

Armature 42 is equipped with a central bearing 48 which rotates upon pinion 50 which is fixed to the case of the actuator. Bearing 48 has an axial slot 52 at one end. This slot engages a tang formed on control rod 54 which runs down through the controlled shock absorber or suspension strut so as to control the shock absorber or strut in accord with U.S. Pat. No. 4,313,529. Thus, the actuator comprises a bistable control mechanism for the shock absorber or strut. A feedback feature is provided by a position contact set contained within the actuator. Movable contact 56 and stationary contact 58 are arranged within the actuator housing such that the contacts will be closed by striker 60 when the actuator is in one of its two stable states. The contact set thus provides feedback to the suspension control module regarding the particular state in which the actuator and suspension unit are resting. This is advantageous because it has been found that certain bistable shock absorbers and McPherson struts of the general type described in U.S. Pat. No. 4,313,529 will spontaneously change from one stable state to another under the influence of driving forces, even in the absence of a command signal to the actuator. Accordingly, in the absence of a feedback circuit one or more suspension units could be in an incorrect position; without the feedback feature, the suspension control module would not have the information that the suspension units were in the incorrect position. As a result, the suspension control module would not be able to correct the improper state.

Figure 3A:
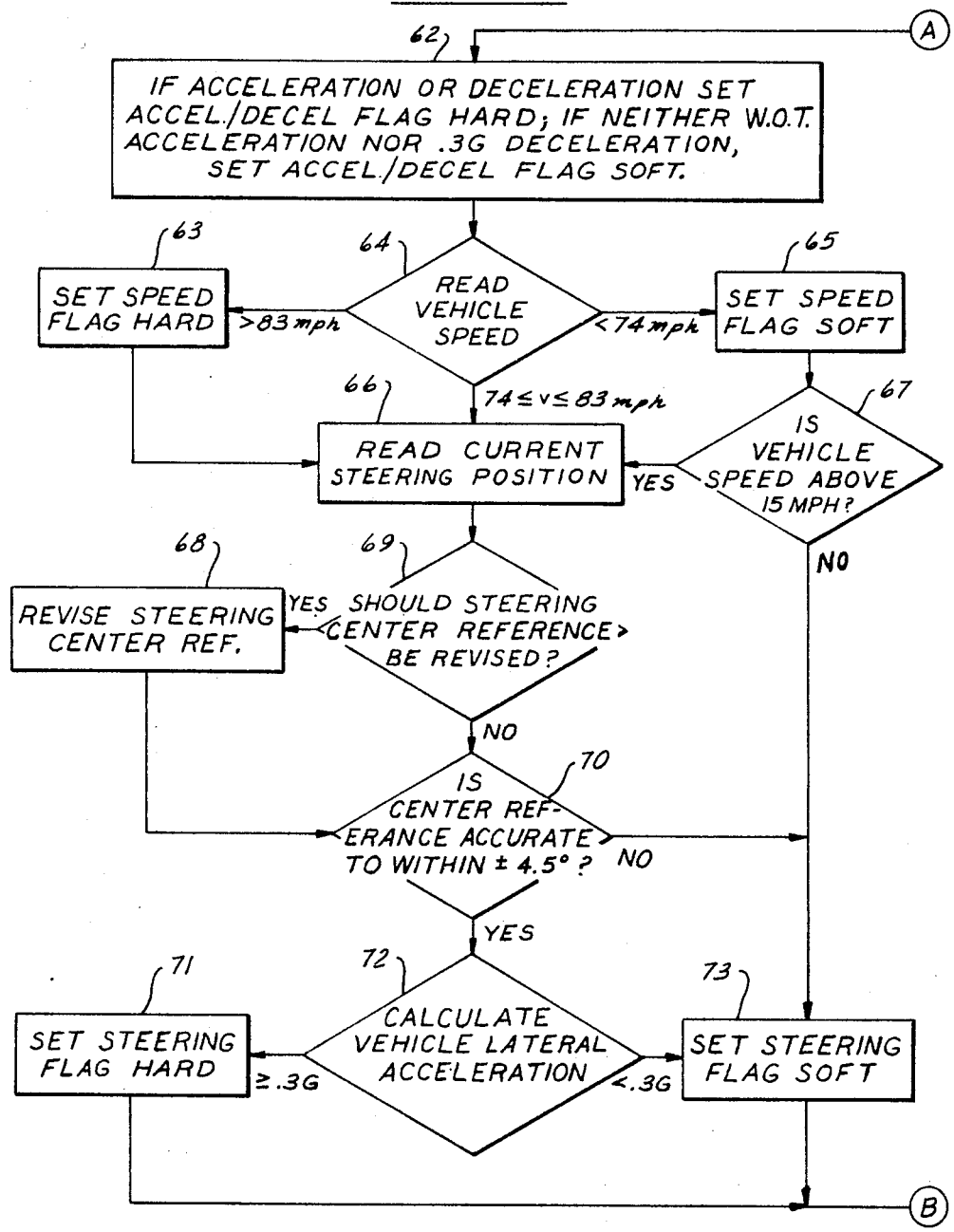
FIGS. 3A and 3B contain a logic flow block diagram in accordance with an embodiment of this invention.
Figure 3B:
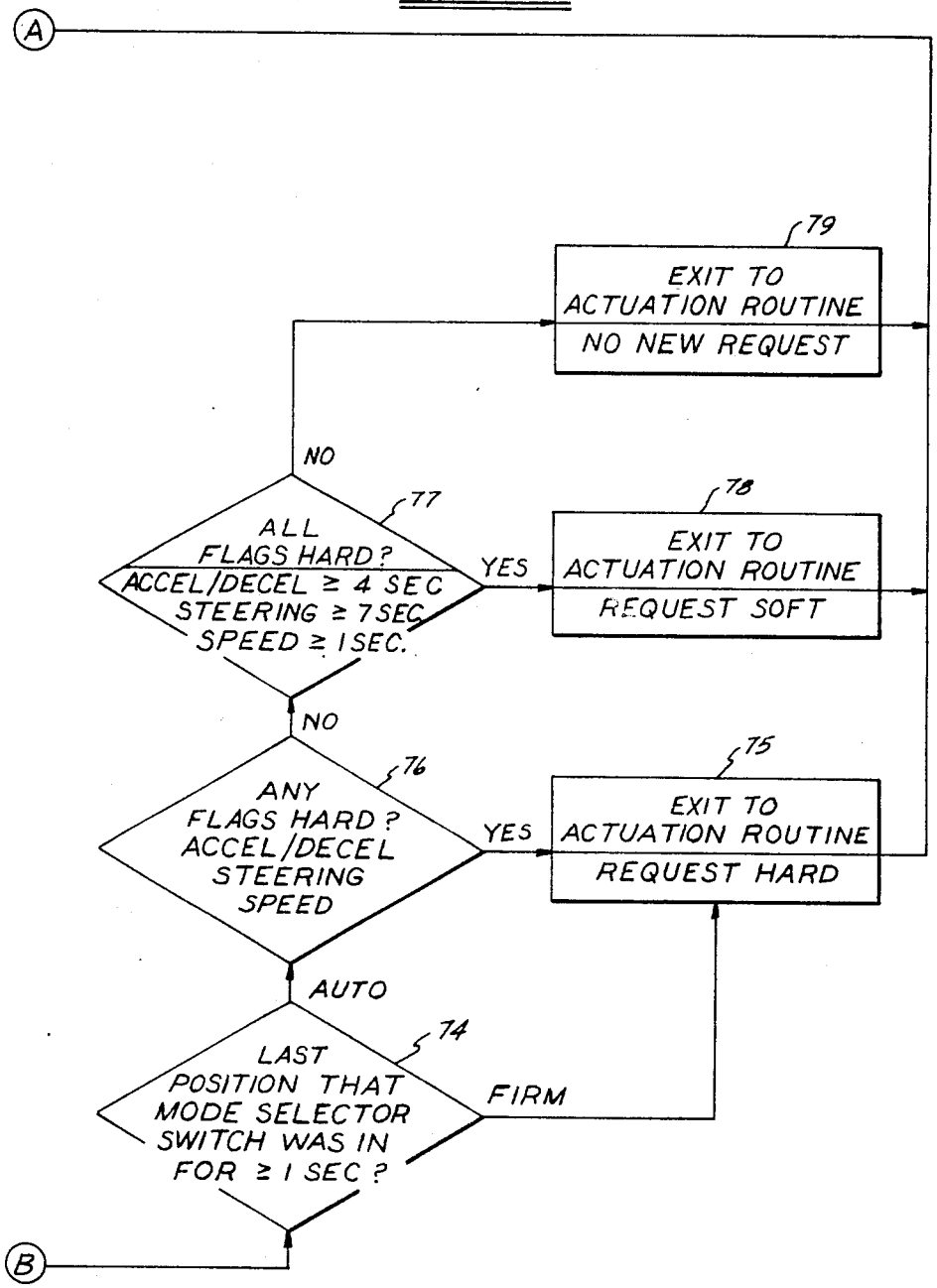

Referring now to FIGS. 3A and 3B, a simplified logic flow diagram for the operation of the control system of the present invention is shown, the two Figures are broken apart merely for convenience, it being understood that lines A—A nd B—B are continuous. Block 62 evaluates the acceleration of the vehicle, whether the acceleration signal originates from acceleration sensor 16 or brake sensor 20. In the event that acceleration or deceleration are of sufficient magnitude, the accel/decel flag within the computer will be set to the hard position; if neither the acceleration or deceleration are of sufficient magnitude, the accel/decel flag will be set soft. In one example, the acleration sensor is calibrated to detect wide open throttle (WOT) accleration and the brake sensor is set to detect brake line pressure sufficient to produce a 0.3G deceleration, but other levels of throttle opening positions and deceleration rate could be used to trigger the accel/decel flat. The term flag merely refers to a register employed as an electronic notebook to keep track of the presence of various triggering levels of the logic variables used to determine which of the stable states the suspension units are to be operated.

At block 64, the vehicle's speed sensor output is read; if vehicle speed is less than 74 miles per hour block 65 sets the speed flag in the soft position. In the event that vehicle speed exceeds 83 miles per hour block 63 sets the speed flag in the hard position and then proceeds to block 66. In the event that vehicle speed is between 74 and 83 miles per hour the strategy proceeds directly to block 66 where the current steering position is read. Block 66 may also be reached through block 67, which inquires whether the vehicle speed is above 15 miles per hour. If the vehicle's speed is greater than 15 miles per hour the strategy proceeds to block 66 to read the current steering position. If vehicle speed is not above 15 miles per hour the strategy proceeds to block 73 wherein the steering flag is set to the soft position.

If the current steering position is read, block 69 inquires into the need for revising the steering center reference. If the reference should be revised the logic flow proceeds to block 68 wherein this command is given. If the steering center reference is not in need of revision the logic proceeds to block 70 wherein an inquiry is made to the accuracy of the steering reference. The steering reference in this case merely means the previously discussed center position for the steering system and blocks 68, 69 and 70 symbolically refer to the logic embodied in the previously disclosed method for dynamically determined the center position of the steering system. In the event that the steering center reference is accurate to within 4.5°, block 72 calculates vehicle lateral acceleration. This acceleration may be calculated by either of two methods.

The first method comprises simple calculation of the product of the square of the vehicle's speed and the excursion angle of the steering system from the predetermined center position. The expression of this calculation has the following form:

$$a_{lat} = V^2(\theta)$$

$a_{lat}$ = predicted value of lateral acceleration
$V^2$ = the square of the vehicle's speed, and
$\theta$ = the excursion angle of the steering system from the predetermined center position.

The following comprises a more comprehensive expression for combining the measured values of vehicle speed, steering system excursion angle and steering system angular velocity:

$$a_{lat} = V^2(\theta + W^2 C)$$

where:
$a_{lat}$ = predicted value of lateral acceleration
$V^2$ = the square of the vehicle's speed
$\theta$ = the magnitude of the excursion angle of the steering system from the predetermined center position
$W^2$ = the square of steering system angular velocity
$C$ = a constant having a positive value in the event that the steering system is moving in a direction so as to increase $\theta$ and a negative value in the event that the steering system is moving in a direction so as to decrease $\theta$.

The second expression set forth above is more comprehensive than the first because it includes the additional term $W^2C$, which accounts for the fact that the instantaneous steering system excursion angle will be further changed by the driver's rotation of the steering wheel in those situations wherein the steering system is being operated at an angular speed greater than zero at the time the excursion angle is measured. The constant "C" corresponds to an assumed maximum deceleration rate for the steering system which could be produced by a human operator.

The previously defined expressions for calculating predicted lateral acceleration allow the suspension control module to deliver a command to the actuators calling for a hard setting in advance of the actual onset of lateral acceleration of the vehicle. This is true because the vehicle will not go into a turn resulting in lateral acceleration until a small but finite time period after the steering system angle changes. The system of the present invention thus offers a significant advantage over prior art systems relying upon acclerometers to sense lateral acceleration, particularly where those systems are combined with passive devices in the nature of conventional shock absorbers which are unable to exert any restoring forces upon the vehicle suspension.

Having calculated the predicted lateral acceleration, the logic examines the magnitude of the predicted acceleration. If the lateral acceleration is predicted as being less than 0.3G, the steering flag is set soft in block 73. If the predicted lateral acceleration is greater than or equal to 0.3G, the steering flag is set hard in block 71. Those skilled in the art will appreciate in view of this disclosure that the threshold values for lateral acceleration recited herein may be modified to suit particular needs of the vehicle and the driver. From either blocks 71 or 73, the logic flow proceeds to block 74 wherein the position of the mode selector switch is read. In the event that the driver placed the switch in the firm position, the actuation routine requests the hard shock absorber setting in block 75. In the event that the mode selector switch is in the automatic position, block 76 asks whether any of the 3 flags is in the hard position. In the event that at least one flag is in the hard position, block 75 requests the hard suspension unit setting. If none of the flags is in the hard position, the logic proceeds to block 77 wherein the amount of time each of the flags has been in the soft position is noted. Specifically, if the accel/decel flag has been in the soft position for a time period greater than or equal to 4 seconds and if the steering flag has been in the soft position for a time period equal to or greater than 7 seconds and if the speed flag has been in the soft positions for a time period greater than or equal to one second, then the actuation routine at block 78 requests the soft setting for the suspension unit. In the event that all of the conditions in block 77 are not met, the actuation routine in block 79 makes no new request. From this point the logic continues to block 62 to be rerun throughout the vehicle operation.

Various modifications and variations will no doubt occur to those skilled in the various arts to which this invention pertains. For example, the particular sensors used in conjunction with the disclosed system may be varied from those disclosed herein and the system may be operated without the manual selector switch. Further, the suspension units may comprise active or passive hydraulic, pneumatic, or electrical units in addition to those disclosed herein. These and all other variations which basically rely on the teachings through which this disclosure has advanced the art are properly considered within the scope of this invention as defined by the appended claims.

I claim:

1. An operating system for a multistable suspension unit having a plurality of predetermined operating states and beind adapted for use with a motor vehicle with a steering system, said operating system comprising:
   first means for measuring the speed of said motor vehicle; and
   second means for predicting the lateral acceleration of said motor vehicle, said second means comprising:
     centering means for dynamically determining a center position for the steering system of said motor vehicle;
     angle measuring means operatively associated with said centering means for measuring an excursion angle of said steering system from said predetermined center position; and
     processing means coupled to said first means and to said angle measuring means for combining the measured values of vehicle speed and steering system excursion angle according to a predetermined formula so as to yield, as a function of vehicle speed and steering system excursion angle, a calculated value for predicting lateral acceleration to be used in selecting one of said plurality of predetermined operating states.

2. The operating system according to claim 1 wherein said processing means for combining the measured values of vehicle speed and said steering system excursion angle is in accordance with the following expression:

$$a_{lat} = V^2 (\theta)$$

where:
  $a_{lat}$ = predicted value of lateral acceleration
  $V^2$ = the square of said vehicle's speed, and
  $\theta$ = the excursion angle of said steering system from said predetermined center position.

3. The operating system according to claim 1 wherein said centering means comprises a system operated according to a method comprising the steps of:
   a. assuming an initial center position:
   b. defining two circumferential zones of equal magnitude comprising a first threshold extending clockwise and a circumferentially displaced second threshold extending counterclockwise from said initial center position;
   c. recording the amount of time said steering system is operated outside of the circumferential zones defined by said first and second thresholds during a predetermined time period; and
   d. determining an updated initial center position based upon the amount of time said steering system has operated outside of the circumferential zones defined by said first and second thresholds during said predetermined time period.

4. The operating system according to claim 3 wherein said method further comprises the step of repeating each of steps b, c and d until said determined initial center position does not change.

5. The operating system according to claim 4 wherein said steps b, c and d are repeated with thresholds having successively smaller magnitudes of circumferential displacement from said initial center position.

6. The operating system according to claim 1 further comprising control means for selecting a predetermined state for said multistable motor vehicle suspension unit as a function of measured vehicle speed and predicted lateral acceleration.

7. The operating system according to claim 6 further comprising means for measuring linear acceleration of said motor vehicle and additional means within said control emans for selecting a predetermined state for said multistable motor vehicle suspension unit as a function of linear acceleration as well as of measured vehicle speed and of predicted lateral acceleration.

8. The operating system according to claim 6 further comprising an actuator means coupled to said control means for placing said suspension unit into said selected predetermined state.

9. The operating system according to claim 6 further comprising means for sensing the particular state in which said suspension unit is resting and for reporting that state to said control means.

10. The operating system according to claim 9 wherein said means for sensing the particular state in which said suspension unit is resting and for repeating that state to said control means comprises a feedback circuit which senses the position of said actuator means.

11. The operating system according to claim 10 wherein said feedback circuit comprises a switch operated by said actuator means.

12. The operating system according to claim 11 further comprising:
control means coupled to said calculation means for producing an output signal indicative of one state of said multistable suspension unit as a function of measured vehicle speed and predicted lateral acceleration.
actuator means responsive to said control means output signal for placing said suspension unit into said selected state; and
feedback means coupled between said control means and said actuator means for sensing the particular state in which said suspension unit is resting and for reporting that state to said control means.

13. The operating system according to claim 11 further comprising:
measuring means for measuring linear acceleration of said vehicle;
control means coupled to said measuring means and to said calculation means for producing an output signal indicative of one state of said multistable suspension unit as a function of measured vehicle speed and linear acceleration and upon predicted lateral acceleration,
actuator means responsive to said control means output signal for placing said suspension unit into said selected state; and
feedback means coupled between said control means and said actuator means for sensing the particular state in which said suspension unit is resting and for reporting that state to said control means.

14. An operating system for a multistable suspension unit having a plurality of predetermined operating states and being adapted for use with a motor vehicle with a steering system, said operating system comprising:
means for measuring the speed of the vehicle; and
means for predicting the lateral acceleration of said vehicle comprising:
means for measuring the excursion angle of said steering system from a predetermined center position;
means for measuring the angular velocity at which said steering system is being operated; and
calculation means for combining the measured values of vehicle speed, steering system excursion angle and steering system angular velocity according to a predetermined formula yielding a calculated value for predicting the lateral acceleration of said motor vehicle.

15. The operating system according to claim 14 wherein said calculation means generates said calculated value for predicting lateral acceleration according to the following expression:

$$a_{lat} = V^2(\theta + W^2 C)$$

where:
$a_{lat}$ = predicted value of lateral acceleration
$V^2$ = the square of said vehicle's speed.
$\theta$ = the magnitude of the excursion angle of said steering system from said predetermined center position
$W^2$ = the square of steering system angular speed velocity
$C$ = a constant having a positive value in the event that the steering system is moving in a direction so as to increase $\theta$ and a negative value in the event that the steering system is moving in a direction so as to decrease $\theta$.

16. A method for operating a multistable suspension unit having a plurality of predetermined operating states for a motor vehicle with a steering system comprising the steps of:
measuring the speed of said vehicle;
measuring the linear acceleration of said vehicle;
predicting the lateral acceleration of said vehicle according to the steps of:
dynamically determining a center position for the steering system of said motor vehicle;
measuring the excursion angle of said steering system from said predetermined center portion;
measuring the angular velocity of said steering system;
combining the measured values of vehicle speed, steering system excursion angle and steering system angular velocity according to a predetermined formula for predicting lateral acceleration;
selecting a predetermined operating state for said multistable suspension unit based upon measured vehicle speed and linear acceleration and upon predicted lateral acceleration; and
placing said multistable suspension unit into said selected state.

17. The method according to claim 16 wherein said predicted lateral acceleration is calculated according to the following expression:

$$a_{lat} = V^2(\theta + W^2 C)$$

where:
$a_{lat}$ = predicted value of lateral acceleration
$V^2$ = the square of said vehicle's speed
$\theta$ = the magnitude of the excursion angle of said steering system from said predetermined center position
$W^2$ = the square of steering system angular speed
$C$ = a constant having a positive value in the event that the steering system is moving in a direction so as to increase $\theta$ and a negative value in the event that the steering system is moving in a direction so as to decrease $\theta$.

18. The method according to claim 17 wherein said center position for the steering system of said motor vehicle is determined according to a method comprising the steps of:
a. assuming an initial center position;
b. defining two circumferential zones of equal magnitude defined by a first threshold extending clockwise and a circumferentially displaced second threshold extending counterclockwise from said initial center position;
c. recording the amount of time said steering system is operated outside of the circumferential zones defined by said first and second thresholds during a predetermined time period; and
d. determining an updated initial center position based upon the amount of time said steering system has operated outside of the circumferential zones defined by said first and second threholds during said predetermined time period.

19. An operating system for a multistable suspension unit having a plurality of predetermined operating states and beind adapted for use with a motor vehicle with a steering system, said operating system comprising:
- means for measuring the speed of the vehicle;
- means for predicting the lateal acceleration of said vehicle comprising:
  - means for measuring the excursion angle of said steering system from a predetermined center position;
  - means for measuring the angular velocity at which said steering system is being operated; and
  - means for combining the measured values of vehicle speed, steering system excursion angle and steering system angular velocity according to a predetermined formula yielding a calculated value for predicting the lateral acceleration of said motor vehicle;
- means for measuring linear acceleration of said vehicle;
- control means for producing an output signal indicative of one state of said multistable suspension unit as a function of measured vehicle speed and linear acceleration and upon predicted lateral acceleration,
- actuator means responsive to said output signal for placing said suspension unit into said selected state; and
- feedback means coupled between said control means and said actuator means for sensing the particular state in which said suspension unit is resting and for reporting that state to said control means.

* * * * *